United States Patent
Wigglesworth et al.

(10) Patent No.: US 9,758,696 B2
(45) Date of Patent: *Sep. 12, 2017

(54) ORGANOSILOXANE NETWORK COMPOSITION

(71) Applicant: Xerox Corporation, Norwalk, CT (US)

(72) Inventors: Tony J. Wigglesworth, Oakville (CA); Adrien Pierre Cote, Mississauga (CA); Brynn Mary Dooley, Toronto (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/138,794

(22) Filed: Dec. 23, 2013

(65) Prior Publication Data

US 2015/0175842 A1    Jun. 25, 2015

(51) Int. Cl.
| | |
|---|---|
| *C09D 183/08* | (2006.01) |
| *C09D 183/14* | (2006.01) |
| *C08G 77/24* | (2006.01) |
| *C08G 77/50* | (2006.01) |

(52) U.S. Cl.
CPC ............ *C09D 183/08* (2013.01); *C08G 77/24* (2013.01); *C08G 77/50* (2013.01); *C09D 183/14* (2013.01)

(58) Field of Classification Search
CPC ................................ C08G 77/52; C08G 77/50
USPC ...................... 528/43, 42; 428/447
See application file for complete search history.

(56) References Cited

U.S. PATENT DOCUMENTS

| | | |
|---|---|---|
| 2004/0077757 A1 | 4/2004 | Araki et al. |
| 2004/0125169 A1 | 7/2004 | Nakagawa et al. |
| 2007/0092644 A1 | 4/2007 | Soutar et al. |
| 2007/0243394 A1 * | 10/2007 | Yamaya et al. ............... 428/447 |
| 2011/0069117 A1 | 3/2011 | Ohzeki et al. |
| 2012/0242749 A1 | 9/2012 | Moorlag et al. |

FOREIGN PATENT DOCUMENTS

EP    1 995 214    * 11/2008

OTHER PUBLICATIONS

Notice of Allowance and Fee(s) Due for U.S. Appl. No. 14/138,802, dated Sep. 14, 2015, 7 pages.
Office Action for U.S. Appl. No. 14/138,802, dated Jun. 9, 2015, 14 pages.
Office Action for U.S. Appl. No. 14/955,430, dated Oct. 21, 2016, 19 pages.
Final Office Action for U.S. Appl. No. 14/955,425 dated Feb. 16, 2017, 6 pages.
Office Action for U.S. Appl. No. 14/955,425, dated Nov. 15, 2016, 25 pages.
Final Office Action for U.S. Appl. No. 14/955,430, dated Feb. 9, 2017, 7 pages.

* cited by examiner

*Primary Examiner* — Kuo-Liang Peng
(74) *Attorney, Agent, or Firm* — Hoffman Warnick LLC

(57) ABSTRACT

There is provided a crosslinked siloxane composition. The crosslinked siloxane composition is a polymerization product of a mixture including from about 2 to about 12 alkoxysilane precursor materials. At least one of the alkoxysilane precursor materials is a hydrophobic alkoxysilane precursor material. In addition at least one of the alkoxysilane precursor materials is an aromatic alkoxysilane precursor material.

10 Claims, 2 Drawing Sheets

ORGANOSILOXANE NETWORK COMPOSITION

CROSS REFERENCE TO RELATED APPLICATIONS

This application relates to commonly assigned copending application Ser. No. 14/138,802 entitled "Fluorinated Organosiloxane Network Composition.", filed simultaneously herewith and incorporated by reference herein.

BACKGROUND

Field of Use

The present disclosure is generally related, in various embodiments, to shapeable coatings.

Background

Organosiloxane network (OSN) based materials are important for a wide-range of industrial applications including durable surface coatings, anti-wetting coatings, dielectric materials, optical waveguides, cosmetics and antifouling coatings. Their properties can be tailored for specific applications through judicious choice of building blocks in a coating formulation.

As such, there is desired a formulation composition durable coatings that can be easily shaped or imprinted.

SUMMARY

The present disclosure provides a crosslinked siloxane composition. The crosslinked siloxane composition is a polymerization product of a mixture including from about 2 to about 12 alkoxysilane precursor materials. At least one of the alkoxysilane precursor materials is a hydrophobic alkoxysilane precursor material. In addition at least one of the alkoxysilane precursor materials is an aromatic alkoxysilane precursor material.

In embodiments, the present disclosure further provides a crosslinked siloxane composition. The composition includes a polymerization product of a mixture having from 2 to 4 alkoxysilane precursor materials. at least one of the alkoxysilane precursor materials is a hydrophobic alkoxysilane represented by;

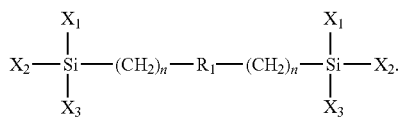

At least one the alkoxysilane precursor material is aromatic represented by;

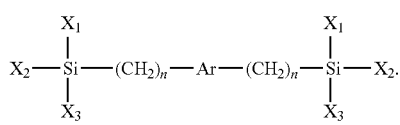

wherein n is from 0 to 4, $X_1$, $X_2$ and $X_3$ are each a hydrocarbon group including 1 to 12 carbons atoms or an alkoxy group including 1 to 6 carbon atoms; $R_1$ is a linear or branched hydrocarbon group, a linear or branched polyether group, a linear or branched polyester group, a linear or branched perfluorinated hydrocarbon group, a linear or branched partially fluorinated hydrocarbon group, a linear or branched perfluorinated polyether group, a linear or branched partially fluorinated polyethergroup, a linear or branched perfluorinated polyester group, a linear or branched partially fluorinated polyester group. Ar represents an aromatic or heteroaromatic group containing from 4 to 24 carbon atoms. The Ar group can be optionally substituted with fluorine atoms.

In embodiments, the present disclosure also provides a surface layer including a substrate and a surface layer disposed on the substrate. The surface layer includes a crosslinked siloxane composition having a polymerization product of a mixture including from 2 to 4 alkoxysilane precursor materials. At least one of the alkoxysilane precursor materials is a hydrophobic represented by the formulae;

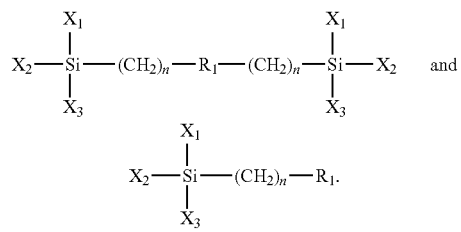

At least one the alkoxysilane precursor material is aromatic represented by the formulae;

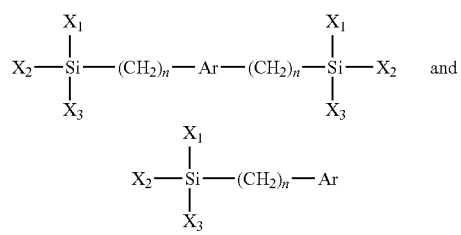

wherein n is from 0 to 4, $X_1$, $X_2$ and $X_3$ are each a hydrocarbon group including 1 to 12 carbons atoms or an alkoxy group including 1 to 6 carbon atoms; $R_1$ is a linear or branched hydrocarbon group, a linear or branched polyether group, a linear or branched polyester group, a linear or branched perfluorinated hydrocarbon group, a linear or branched partially fluorinated hydrocarbon group, a linear or branched perfluorinated polyether group, a linear or branched partially fluorinated polyethergroup, a linear or branched perfluorinated polyester group, a linear or branched partially fluorinated polyester group. Ar represents an aromatic or heteroaromatic group containing from 4 to 24 carbon atoms. The Ar group can be optionally substituted with fluorine atoms.

Figure 1:
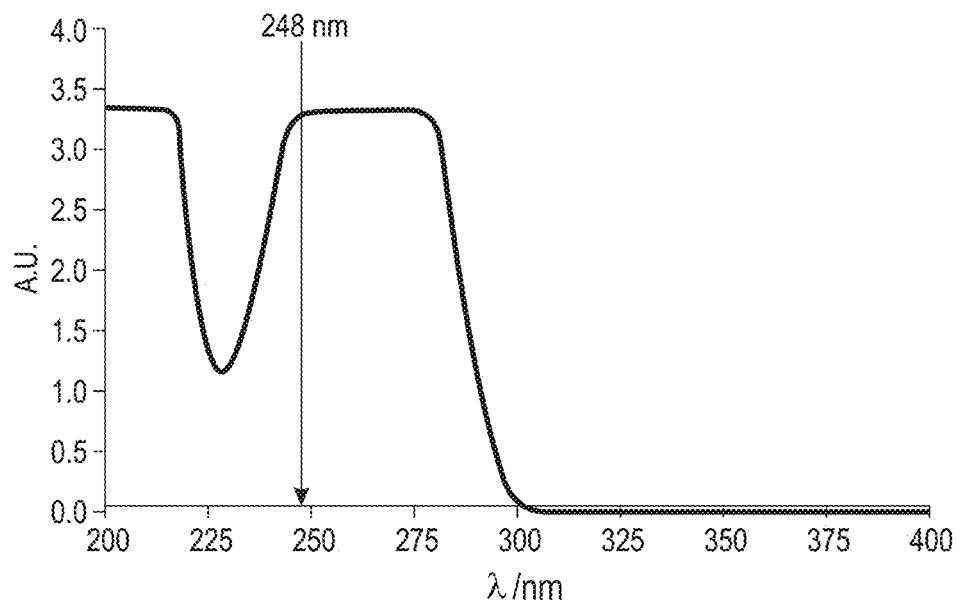
FIG. 1 is an absorbance spectrum of the chromophore used in Example 3.

It should be noted that some details of the figures have been simplified and are drawn to facilitate understanding of the embodiments rather than to maintain strict structural accuracy, detail, and scale.

DESCRIPTION OF THE EMBODIMENTS

In this specification and the claims that follow, singular forms such as "a," "an," and "the" include plural forms unless the content clearly dictates otherwise.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The terms "hydrocarbon" and "alkane" refer, for example, to branched and unbranched molecules having the general formula $C_nH_{2n+2}$, in which n is a number of 1 or more, such as from about 1 to about 60, or from about 2 to about 30, or from about 4 to about 20. Exemplary alkanes include methane, ethane, n-propane, isopropane, n-butane, isobutene, tort-butane, octane, decane, tetradecane, hexadecane, eicosane, tetracosane, and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

In embodiments, the instant disclosure provides a formulation composition (also referred to as a "composition" or "formulation" interchangeably) that can be cleanly patterned and shaped using laser ablation. The composition may be cured to prepare a crosslinked organosiloxane network (OSN). The coatings may be cured on a surface forming a crosslinked organosiloxane layer. The coatings produced according to the present disclosure are thermally stable and can be easily shaped through laser ablation. The coatings are also resistant to surface wear or damage.

For specific applications a thin-film composition that can be cleanly patterned or shaped using laser ablation is required. This is needed so that clean apertures or other shapes can be laser drilled into the coating. This task is non-trivial as the material must ablate cleanly with no observable cracking, flaking or delamination.

In general, organosiloxane networks are highly crosslinked materials containing organic segments bound together via siloxane linkages. These materials exhibit high thermal robustness and high mechanical strength. The surface and mechanical properties of an organosiloxane network can be tailored for particular applications by selecting suitable building blocks and coating formulations. That is to say, the organosiloxane networks according to the instant disclosure are tunable materials whose properties can be varied through the selection of the type and amount of particular precursors used to produce the organosiloxane networks. The tunability of organosiloxane networks makes them attractive materials for durable coatings.

In embodiments, the formulation composition according to the instant disclosure may be applied to a surface as a stable wet layer. In embodiments, the formulation composition may be cured to form a crosslinked siloxane coating on the surface. The coatings produced by the methods of the instant disclosure are thermally robust. In addition, the coating produced according to the instant disclosure exhibits little no chemical interaction with typical solvents. That is to say, the crosslinked siloxane coatings prepared according to the instant disclosure exhibit very low adhesion.

The formulation compositions according to the instant disclosure may be applied to a variety of substrates, including stainless steel and polyimide, using a variety of solution-based processing methods (spray, dip, blade coatings), yielding a suitable thickness predetermined by the user. The formulation composition may be selected to have light absorption at a predetermined wavelength in order to promote shaping through lase ablation.

Formulation Composition

The formulation composition disclosed herein is a polymerization product of a mixture including from about 2 to about 12 alkoxysilane precursor materials, such as from about 2 to about 10 alkoxysilane precursor materials, or from about 2 to about 8 alkoxysilane precursor materials. In embodiments, at least one of the alkoxysilane materials is a hydrophobic alkoxysilane precursor material and at least one of the alkoxysilane precursor materials is an aromatic alkoxysilane precursor material.

In embodiments, the crosslinked siloxane composition includes a mole ratio of hydrophobic alkoxysilane precursor materials to aromatic alkoxysilane precursor materials of from about 1:9 to about 9:1. The aromatic alkoxysilane precursor material imparts a light absorption property to the material. The aromatic alkoxysilane precursor material attenuates the laser ablation of the material.

The term hydrophobic (superhydrophobic) refers, for example, to the property of repelling water, or other polar species, such as methanol. Furthermore, hydrophobic implies an inability to form strong hydrogen bonds to water or other hydrogen bonding species. Hydrophobic materials are typically characterized by having water contact angles greater than 90° as measured using a contact angle goniometer or related device. Highly hydrophobic as used herein can be described as when a droplet of water forms a high contact angle with a surface, such as a contact angle of from about 130° to about 180°. Superhydrophobic as used herein can be described as when a droplet of water forms a high contact angle with a surface, such as a contact angle of greater than about 150°, or from greater about 150° to about 180°.

In embodiments, the hydrophobic precursors may independently vary in their number of alkoxy substitutions. For example, in embodiments, the hydrophobic alkoxysilane precursor materials may be independently selected from monofunctional, difunctional, or trifunctional alkoxysilanes. For example, in embodiments, the hydrophobic alkoxysilane precursor materials may be monofunctional alkoxysilanes, such as trimethylmethoxysilane; difunctional alkoxysilanes such as dimethyldimethoxysilane, diphenyldimethoxysilane or methylphenyl-dimethoxysilane; or trifunctional alkoxysilanes such as methyltrimethoxysilane, methyltriethoxysilane, ethyltrimethoxysilane, methyltrimethoxyethoxysilane, vinyltrimethoxysilane, vinyltriethoxysilane, phenyltrimethoxysilane, γ-glycidoxy-propylmethyldiethoxysilane, γ-glycidoxypropyltrimethoxysilane, γ-glycidoxy-propyltriethoxysilane, γ-aminopropyltriethoxysilane, γ-aminopropyltrimethoxysilane, γ-aminopropylmethyldimethoxysilane, N-β-(aminoethyl)-γ-aminopropyltriethoxy-silane, (tridecafluoro-1,1,2,2-tetrahydrooctyl)triethoxysilane, (3,3,3-trifluoropropyl)-trimethoxysilane, 3-(heptafluoroisopropoxy)

propyltriethoxysilane, 1H,1H,2H,2H-perfluoroalkyltriethoxysilane, 1H,1H,2H,2H-perfluorodecyltriethoxysilane or 1H,1H,2H,2H-perfluorooctyltriethoxysilane.

In embodiments, the hydrophobic alkoxysilane precursor material may be a linear or a branched hydrocarbon. In embodiments, the hydrophobic alkoxysilane precursors may include siloxyfluorocarbon (SFC) precursors. SFC precursors are designed to incorporate fluorinated chains that add flexibility and low-surface energy character to the resulting material. A variety of SFC precursors with varying siloxane and fluorocarbon components may be used to prepare OSN coatings, including di- and tri-alkoxy silanes, linear and branched fluoroalkanes, and fluoroarenes.

In embodiments, the hydrophobic alkoxysilane precursor material may be represented by the structure:

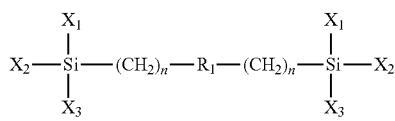

wherein n is from about 0 to about 4, $R_1$ is an alkyl group having from about 1 to about 30 carbons, such as from about 1 to about 20 carbons or from about 1 to about 10 carbon atoms, or an aliphatic or aromatic fluorocarbon chain; and $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms.

In addition to the monomers listed above, the hydrophobic alkoxysilane precursor may be represented by the structure:

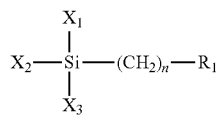

Where n, $R_1$, $X_1$, $X_2$, and $X_3$ are as defined above.

In embodiments, the aromatic alkoxysilane precursor material may be represented by the structure:

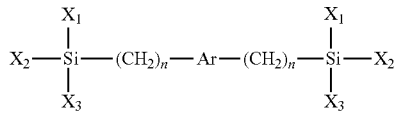

wherein n is from about 1 to about 4, where $R_1$ is an alkyl group having from about 1 to about 30 carbons, such as from about 1 to about 20 carbons or from about 1 to about 10 carbon atoms, or an aliphatic or aromatic fluorocarbon chain; and $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms. Ar represents an aromatic or heteroaromatic group containing from 4 to 24 carbon atoms. The Ar group can be optionally substituted with fluorine atoms. In embodiments, Ar groups include phenyl, biphenyl, naphthyl, anthracenyl, binaphthyl, 4-nitrophenyl, 4-fluorophenyl and the like.

In addition to the monomers listed above, the aromatic alkoxysilane precursor may be represented by the structure:

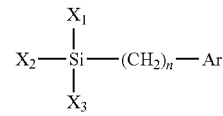

where n is from about 0 to about 4, $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms. Ar represents an aromatic or heteroaromatic group containing from 4 to 24 carbon atoms. The Ar group can be optionally substituted with fluorine atoms. In embodiments, Ar groups include phenyl, biphenyl, naphthyl, anthracenyl, binaphthyl, 4-nitrophenyl, 4-fluorophenyl and the like.

In addition to the monomers listed above, the siloxyfluorocarbon networked polymer may be prepared using monomers selected from the group consisting of silicon tetraalkoxide and branched pentasilanes. The silicon tetraalkoxide is represented by the respective structure:

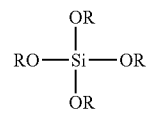

The branched pentasilanes are represented by the respective structure:

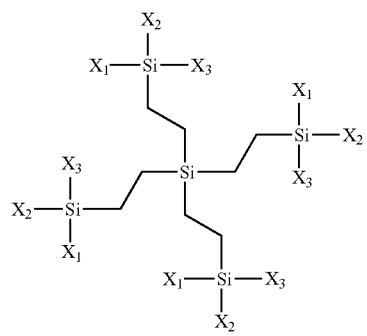

where $X_1$, $X_2$, and $X_3$ are as defined above.

The monomers may be networked together so that all monomers are molecularly bonded together in the cured coating via silicon oxide (Si—O—Si) linkages. Therefore, in embodiments, a molecular weight cannot be given for the siloxyfluorocarbon networked polymer because the coating may be crosslinked into one system.

In embodiments, the alkoxysilane precursors are processed via sol-gel processing (discussed below). In embodiments, the mole ratio of the hydrophobic alkoxysilane precursors to the aromatic alkoxysilane precursor materials may be from about 1:9 to about 9:1, such as from about 1:7 to about 7:1, or from about 3:5 to about 5:3, or about 1:1.

The final OSN can then be shaped using a laser ablation technique wherein the incident irradiation wavelength is at or near the absorption maximum of the aromatic chromophore. In embodiments the irradiation wavelength is within 20 nm of the absorption maximum of the aryl chromophore. The final shape of the material is application dependent. Some representative shapes or patterns include but are not limited to individual holes or apertures, nanopillars, nanocones, regular hexagonal patterns, lines or channels, surface relief gratings, and 3D objects including letters or symbols.

The aromatic group of the aromatic alkoxysilane precursor material is tailored to absorb radiation at a predetermined wavelength. This allows one to ablate material from the composition using a laser at the predetermined wavelength.

As discussed above, in embodiments, the instant disclosure provides a formulation composition to produce a organosiloxane (OSN) network composition. In embodiments, the formulation composition may comprise a sol prepared from a mixture of monomers comprising at least one alkoxysilane monomer; a solvent; a catalyst, and water. In embodiments, stable formulations may be produced by balancing the amount of monomer with the amount of catalyst, and by using a suitable amount of alcohol-based solvent. In embodiments, the formulation compositions may be applied to a substrate while in the sol phase, and gelation may occur upon standing or with heat treatment.

Sol-Gel Polymerization

Siloxyfluorocarbon monomers may be crosslinked via solution-gelation (or "sol-gel") chemistry, where hydrolysis and condensation of alkoxide or hydroxide groups occurs and upon curing at elevated temperatures, produces a crosslinked siloxane coating that may be used as a coating, such as for print head face plates. The crosslinked fluorinated siloxane coating prepared according to the instant disclosure can withstand high temperature conditions without melting or degradation, is mechanically robust under such conditions, and displays good release under such conditions.

A general process for forming sol-gels is discussed, for example, in C. J. Brinker & G. Scherer, Sol-Gel Science: The Physics and Chemistry of Sol-Gel Processing (Academic Press, Boston, 1990), and U.S. Patent Application Publication No. 2007/0082207, the disclosures of which are incorporated herein by reference in their entireties. This two-step reaction process, which transforms a miscible one-phase liquid solution into a two-phase material, is called "sol-gel transition." Generally, an alkoxysilane/solvent/water mixture is slow to hydrolyze. However, the hydrolysis rate is a function of the solution pH and, therefore, may be controlled by the addition of an acid or base as a catalyst. The reaction mixture can further include other materials, such as organic monomers or polymers or other additives, which can become either chemically bound into the polymer network or entrapped in the polymer structure.

The sol-gel polymerization processes according to the instant disclosure may be carried out at any suitable temperature, such as from about 25° C. to about 200° C., or from about 40° C. to about 150° C., or from about 65° C. to about 100° C.

The monomers are networked together so that all monomers are bonded together in the cured coating via silicon oxide (Si—O—Si) linkages. Therefore, a molecular weight cannot be given for the siloxyfluorocarbon networked polymer because the coating is crosslinked into one system.

In embodiments, one can use metal alkoxide (M=Si, Al, Ti, and so forth) functionalities as cross-linking components between fluorocarbon chains. For cross-linking to occur efficiently throughout the composite, bifunctional fluorocarbon chains are used. Mono-functional fluorocarbon chains can also be added to enrich fluorination content. $CF_3$-terminated chains align at the fusing surface to reduce surface energy and improve release.

Solvents used for sol-gel processing of siloxycarbon precursors and coating of layers include organic hydrocarbon solvents, and fluorinated solvents. Alcohols such as methanol, ethanol, and isopropanol are used to promote sol-gel reactions in solution. Further examples of solvents include ketones such as methyl ethyl ketone, and methyl isobutyl ketone. Mixtures of solvents may be used. In embodiments, the solvent may be an alcohol solvent. In embodiments, the alcohol solvent may be present in an amount of at least 20 weight percent of the formulation composition, such as from about 20 weight percent to about 70 weight percent, or from about 30 weight percent to about 50 weight percent of the formulation composition.

In embodiments, the solvent system may include the addition of a portion of water, such as from about 1 molar equivalent to 10 molar equivalents of water compared to siloxyfluorocarbon precursors or the siloxane terminated fluorocarbons, or from about 2 molar equivalents to about 6 molar equivalents of water.

Upon the addition of water to the solution of sol gel precursors, alkoxy groups react with water, and condense to form agglomerates that are partially networked, and are referred to as a sol. The sol may form a gel upon standing or upon drying.

In embodiments, the viscosity of the sol may be from about 1 centipoises (cPs) to about 10 cPs, such as from about 2 to about 9 cPs, or from about 3 to about 8 cPs, when the sol is prepared. In embodiments, the viscosity of the sol when the sol is applied to a substrate In embodiments, the sol may be applied to a substrate. Following coating of the sol onto a substrate, a gel may be formed upon standing or from drying with heat treatment, forming a fully networked siloxane coating on the substrate.

In embodiments, the crosslinked siloxane composition does not dissolve when exposed to solvents (such as ketones, chlorinated solvents, ethers etc.), does not degrade at temperatures up to 350° C., and is stable at higher temperatures, depending on the system.

In embodiments, the coating solution may be deposited on a substrate using any suitable liquid deposition technique. Exemplary methods for depositing the coating solution on the substrate include draw-down coating, spray coating, spin coating, flow coating, dipping, spraying such as by multiple spray applications of very fine thin films, casting, webcoating, roll-coating, extrusion molding, laminating, or the like. The thickness of the coating solution may be from about 100 nm to about 20 μm, such as from about 500 nm to about 10 μm, or from about 1 μm to about 5 μm.

In some embodiments, a coating technique that may be used is meniscus coating of steel surfaced jetstacks while applying positive pressure to the apertures to prevent their occlusion during coating. When making polyimide aperture plates, the jet openings are formed by laser ablation after coating. The coating can include laser absorptive materials to aid the ablation process.

As discussed above, stable formulation compositions may be produced by balancing the amount of monomer to the amount of catalyst, and by using a sufficient amount of solvent, such as alcohol-based solvent. In embodiments, a solution of monomers in ethanol or another alcohol, such as methanol or isopropanol, or a mixture containing alcohol, where the solvent is present in an amount of at least 20 weight percent of the formulation composition. The formulation composition may be prepared by adding water from about 1 molar equivalent to about 10 molar equivalents of water compared to siloxyfluorocarbon precursors or the siloxane terminated fluorocarbons, or from about 2 molar equivalents to about 6 molar equivalents of water, with a catalytic amount of acid or base to initiate networking. In embodiments, the catalyst is a hydroxide ion catalyst present in an amount of from about 0.1 mol % to about 5 mol % hydroxide ion per silicon atom, such as from about 0.2 mol % to about 3 mol %, or from about 0.3 mol % to about 1 mol %.

In embodiments, solids loading of from about 20 weight percent to about 80 weight percent, such as from about 30 weight percent to about 70 weight percent, or from about 40 weight percent to about 60 weight percent, may be employed.

In embodiments, the sol thus produced may be filtered prior to coating. In embodiments, the sol may also be subjected to a pre-curing step following filtration, such as by heating at a temperature of from about 40° C. to about 60° C., such as from about 45° C. to about 55° C., for from about 10 to about 45 minutes, such as from about 20 to about 40 minutes, or from about 25 to about 35 minutes. In embodiments, pre-curing may take place before the sol is coated onto a substrate. In embodiments, pre-curing may take place after the sol is coated onto a substrate.

In embodiments, the formulation composition may be coated on a substrate, forming a layer of the formulation composition on the substrate. In embodiments, after coating, the formulation composition layer may be air-dried and heat-treated. In embodiments, following air-drying and heat-treatment between 100° C. to 250° C., the formulation composition layer will network to yield a coating.

In embodiments, the formulation composition may be coated on a surface. The formulation may be cured to yield a crosslinked siloxane layer on the surface. In such embodiments, the crosslinked siloxane layer has an increased adherence (such as a metal or polymer face plate) and increased wear resistance. In embodiments, the topcoat layer also exhibits little or no adhesion.

EXAMPLES

The following examples are being submitted to illustrate embodiments of the present disclosure. These examples are intended to be illustrative only and are not intended to limit the scope of the present disclosure. Parts and percentages are by weight unless otherwise indicated.

As representative examples several fluorinated organosiloxane networks (fOSN) were prepared as thin-films (1-2 μm thick) on Upilex polyimide or quartz substrates using a series of different fluorinated and aryl dialkoxy silane building blocks as described in the Examples below. The formulations were prepared in n-butanol (at about 30 weight percent to about 70 weight percent solids loading) using tetrabutylammonium hydroxide base as catalyst (From about 0.5 mole percent to about 1 mole percent) and activated with water (1 molar equiv.). After thorough mixing, the formulations were filtered through a 0.45 μm PTFE syringe filter and deposited using either spin-coating or draw-down coating techniques. After curing at about 155° C. for about 40 minutes the films were evaluated by UV-Vis spectroscopy and individual apertures were laser drilled into the films by laser ablation using a 248 nm laser. The materials used were designed and optimized for applications as an antiwetting coating for an HD piezo inkjet print-head front face plate and is not meant to limiting. The results are presented in the Examples below.

Comparative Example 1. Baseline Laser Drilling Performance of fOSN

A fOSN coating was prepared from fluorinated building block Structure 1a below to establish the baseline laser drilling performance at 248 nm. This material has no chromophore added and does not absorb at 248 nm. As a result the laser drilling performance is poor and complete apertures could be fabricated using this composition.

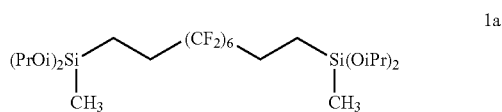

Comparative Example 2

A fOSN coating was prepared from the fluorinated building blocks Structure 1a, Structure 2a and Structure 3a to establish a low surface energy material which has good antiwetting properties and improved laser drilling performance at 248 nm. This material has a chromophore that absorbs weakly at 248 nm The absorbance of the aryl chromophore of represented by Structure 3a is at its peak an a wavelength of about 202 nm. The absorbance of the aryl chromophore of represented by Structure 3a at 248 nm is about 0.1 A.U. As a result the laser drilling performance is poor and complete apertures could not be fabricated using this composition.

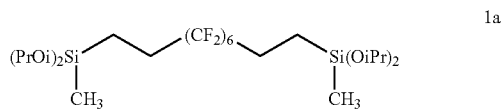

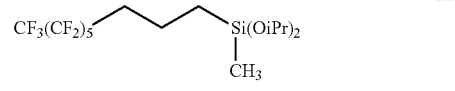

(10 wt. % of film)

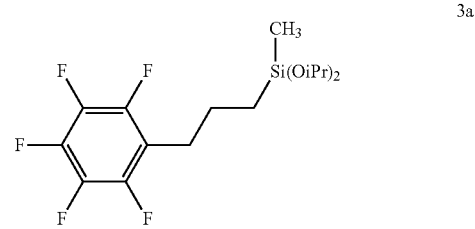

(5 wt. % of film)

Example 3

Figure 2:
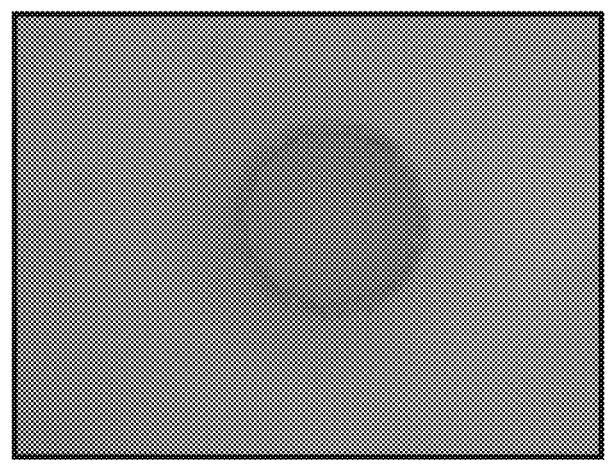
FIG. 2 is an optical micrograph of a laser ablated aperture of the formulation used in Example 3

A fOSN was prepared from the fluorinated building blocks as shown below in Structures 1a, 2b and 3c. The resulting material possessed a low surface energy which translates into excellent antiwetting properties. This material has the correct chromophore and absorbs strongly at 248 nm as shown in FIG. 1). The laser drilling performance at 248 nm is shown in FIG. 2. As a result the laser drilling performance is improved and complete apertures could be fabricated using this composition.

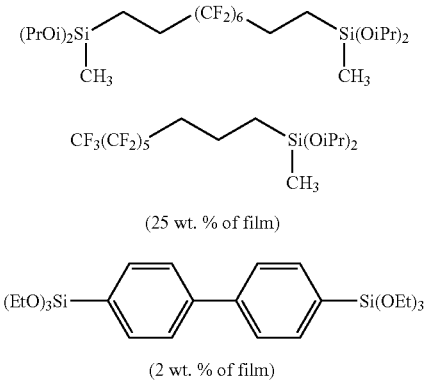

(25 wt. % of film)

(2 wt. % of film)

Example 4

Figure 3:
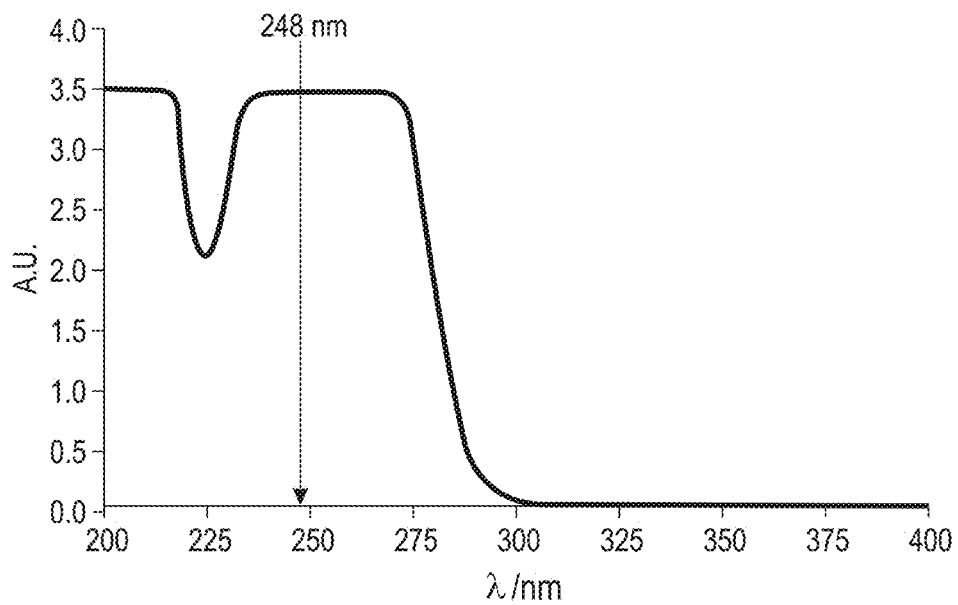
FIG. 3 is an absorbance spectrum of the chromophore used in Example 4.
Figure 4:
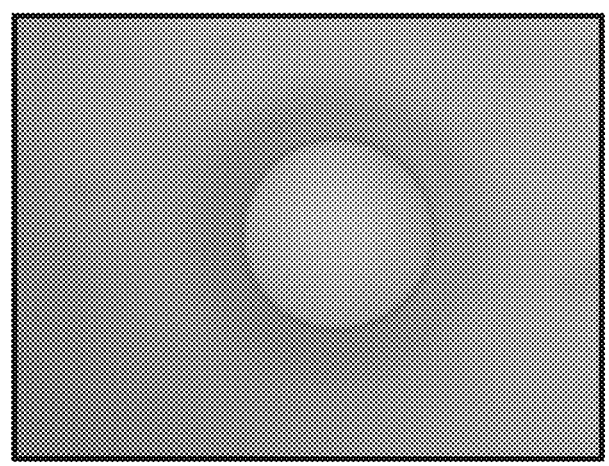
FIG. 4 is an optical micrograph of a laser ablated aperture of the formulation used in Example 4.

A fOSN was prepared from the fluorinated building blocks as shown below in Structures 1a, 2b and 3c. The resulting material possessed a low surface energy which translates into excellent antiwetting properties. This material has the correct chromophore and absorbs strongly at 248 nm as shown in the UV-spectrum of FIG. 3. The laser drilling performance at 248 nm is shown in FIG. 4. As a result the laser drilling performance is improved and complete apertures could be fabricated using this composition. In FIG. 4 no cracking or delamination is observed around aperture edges. In this formulation all silane building blocks have similar reactivity leading to a homogeneous distribution of the chromophore in the coating with excellent laser drilling performance.

Disclosed herein is a shapeable OSN composition with covalently bound chromophores that can be cleanly "shaped or patterned" using a laser ablation technique. The key features enabling this invention are the incorporation of a covalently bound chromophore that is statistically and uniformly distributed in the network and has a high absorption coefficient at the patterning wavelength.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A crosslinked siloxane composition comprising:
a polymerization product of a mixture comprising from about 2 to about 12 alkoxysilane precursor materials, wherein at least one of the alkoxysilane precursor materials is a hydrophobic alkoxysilane precursor material wherein the at least one hydrophobic alkoxysilane precursor material is selected from the group consisting of: linear fluoroalkanes, branched fluoroalkanes, and fluoroarenes; and
at least one of the alkoxysilane precursor materials is an aromatic alkoxysilane precursor material represented by:

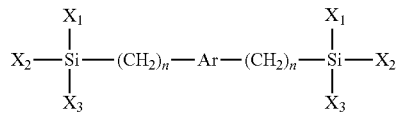

wherein n is from 0 to 4, $X_1$, $X_2$ and $X_3$ are each a hydrocarbon group including 1 to 12 carbons atoms or an alkoxy group including 1 to 6 carbon atoms, wherein at least one of $X_1$, $X_2$ and $X_3$ is an alkoxy group including 1 to 6 carbon atoms; and Ar is selected from a group consisting of: biphenyl, naphthyl, anthracenyl, binaphthyl, 4-nitrophenyl and 4-fluorophenyl, wherein Ar can be optionally substituted with fluorine atoms, wherein Ar has an absorption maximum within 20 nm of 248 nm.

2. The crosslinked siloxane composition according to claim 1, wherein the crosslinked siloxane composition is the polymerization product of a mixture of from about 2 to about 8 alkoxysilane precursor materials.

3. The crosslinked siloxane composition according to claim 1, wherein the hydrophobic alkoxysilane precursor material and the aromatic alkoxysilane precursor material are homogenously distributed in the crosslinked siloxane composition.

4. The crosslinked siloxane composition according to claim 1, wherein the mole ratio of hydrophobic alkoxysilane precursor materials to aromatic alkoxysilane precursor materials is from about 1:9 to about 9:1.

5. The crosslinked siloxane composition according to claim 1, wherein the mole ratio of hydrophobic alkoxysilane precursor materials to aromatic alkoxysilane precursor materials is from about 1:7 to about 7:1.

6. The crosslinked siloxane composition according to claim 1, wherein all the alkoxysilane precursor materials are bonded together via silicon oxide (Si—O—Si) linkages in a single system and wherein the single system is insoluble in solvents selected from the group consisting of ketones, chlorinated solvents and ethers.

7. A crosslinked siloxane composition comprising a polymerization product of a mixture comprising from 2 to 4 alkoxysilane precursor materials, wherein at least one of the alkoxysilane precursor materials is a hydrophobic alkoxysilane represented by;

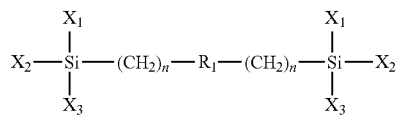

and wherein at least one the alkoxysilane precursor material is aromatic represented by;

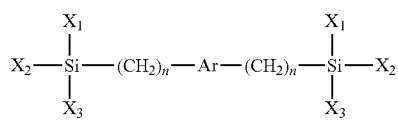

wherein n is from 0 to 4, $X_1$, $X_2$ and $X_3$ are each a hydrocarbon group including 1 to 12 carbons atoms or an alkoxy group including 1 to 6 carbon atoms, wherein at least one of $X_1$, $X_2$ and $X_3$ is an alkoxy group including 1 to 6 carbon atoms; $R_1$ is a linear or branched perfluorinated hydrocarbon group, a linear or branched partially fluorinated hydrocarbon group, a linear or branched perfluorinated polyether group, a linear or branched partially fluorinated polyethergroup, a linear or branched perfluorinated polyester group, a linear or branched partially fluorinated polyester group, and Ar is selected from a group consisting of: biphenyl, naphthyl, anthracenyl, binaphthyl, 4-nitrophenyl and 4-fluorophenyl, can be optionally substituted with fluorine atoms, wherein Ar has an absorption maximum within 20 nm of 248 nm.

8. The crosslinked siloxane composition according to claim 7, wherein a mole ratio of hydrophobic alkoxysilane precursor materials to aromatic alkoxysilane precursor materials is from about 1:9 to about 9:1.

9. The crosslinked siloxane composition according to claim 7, wherein a mole ratio of hydrophobic alkoxysilane precursor materials to aromatic alkoxysilane precursor materials is from about 1:7 to about 7:1.

10. The crosslinked siloxane composition according to claim 7, wherein all the alkoxysilane precursor materials are bonded together via silicon oxide (Si—O—Si) linkages in a single system and wherein the single system is insoluble in solvents selected from the group consisting of ketones, chlorinated solvents and ethers.

\* \* \* \* \*